Patented Aug. 3, 1954

2,685,601

UNITED STATES PATENT OFFICE 2,685,601

METHOD OF HYDROLYZING PROTEINS TO AMINO ACIDS

Johannes S. Buck and Alex Lesuk, Glenmont, N. Y., assignors to Sterling Drug Inc., New York, N. Y., a corporation of Delaware No Drawing. Application April 6, 1950, Serial No. 154,433

6 Claims. (Cl. 260—529)

This invention relates to an improved process for the acid hydrolysis of proteins.

It is an object of this invention to provide a novel method for the acid hydrolysis of proteins whereby the formation of humin is substantially or completely avoided and destruction of the naturally occurring l-tryptophan is minimized.

At the present time the three methods generally employed to hydrolyze proteins are: enzymatic hydrolysis, which is usually slow and incomplete; alkali hydrolysis, which racemizes the optically active amino acids; and acid hydrolysis, which despite several disadvantages is the most commonly used of these methods, chiefly because of its rapidity and convenience.

The conventional methods for the acid hydrolysis of proteins to obtain protein hydrolysates containing a mixture of amino acids together with varying amounts of partially hydrolyzed protein fragments such as polypeptides, proteoses, peptones, etc. comprise heating the protein with an aqueous solution of a strong mineral acid at about 100–170° C. until the desired degree of hydrolysis has taken place. However, these methods usually produce considerable humin and, moreover, destroy all or most of the tryptophan content of the protein. Removal of the undesired humin entails considerable loss of various amino acids. The loss of these amino acids and the tryptophan destruction are especially disadvantageous when the protein hydrolysate is to be employed for nutritional purposes.

Our new process comprises heating the protein with an aqueous solution of a mixture of hypophosphorous acid and a strong mineral acid of the group consisting of hydrochloric acid, sulfuric acid, and phosphoric acid at 100–170° C. for such period of time as is desired to effect partial or complete hydrolysis of the protein. The extent of the heating period will depend on the degree of hydrolysis desired, and this in turn depends on such factors as concentration of the hydrolytic acids, type of protein, weight of the protein, etc. It will be readily appreciated, however, that for a given set of conditions the course of the hydrolysis can be followed by appropriate analytical determinations and adjustment of the heating period can be made accordingly. We have found that, ordinarily, a heating period of six to seventy-two hours is sufficient to substantially hydrolyze the protein to amino acids. The protein hydrolysate thus obtained is substantially or completely free of humin, and all but a small proportion of the original tryptophan content of the protein is preserved.

The protein hydrolysate produced by our invention can be utilized in conventional manner as a source of individual amino acids or for the preparation of mixtures for dietary or nutritive purposes. For the latter purposes, the mineral acids must of course be substantially removed from the hydrolysate. This removal can be effected by procedures known in the art, for example by the use of suitable ion exchange resins.

A useful procedural variation of our process which we have employed comprises heating the protein with aqueous hypophosphorous acid alone for a few hours, the length of this heating period not being critical, then adding the second acid, i. e., hydrochloric, sulfuric or phosphoric acid, to the partially hydrolyzed mixture, and further heating the mixture for such time as necessary to carry out the hydrolysis to the desired degree.

Although, generally speaking, the second acid used with the hypophosphorous acid in our process can be any strong mineral acid which is substantially devoid of pronounced oxidizing or reducing action in aqueous solution, we prefer for practical reasons to restrict the choice of the second acid to hydrochloric, sulfuric or phosphoric acids as pointed out above. It is to be understood of course that, in the choice of the second mineral acid to be employed with the hypophosphorous acid, reducing acids such as hydriodic acid and oxidizing acids such as nitric acid are not contemplated by our invention, since these acids are not operative to give the advantageous results afforded by our new process.

The proportion of hypophosphorous acid in the mixture of the two acids employed in our invention can be varied between rather wide limits. Thus, the number of equivalents of hypophosphorous acid used can be as low as about 10% of the total number of equivalents of acid in the mixture, the remainder of course being the other mineral acid, i. e. hydrochloric, sulfuric or phosphoric acid, while still avoiding the formation of humin and minimizing tryptophan destruction. This is an advantageous feature since the hypophosphorous acid is more expensive than the strong mineral acids used with it. The choice of an upper limit of the proportion of hypophosphorous acid is affected primarily by the speed of the hydrolytic reaction, since, for a given quantity of protein, a decrease of the proportion of the strong mineral acid component of the mixture of acids is generally reflected in a decreased rate of hydrolysis. We prefer not to employ more than 90% of hypophosphorous acid, since the prolonged periods of hydrolysis required for higher percentages ordinarily are undesirable. However, as will be apparent, the choice of the particular ratio of the acids depends on the requirements of the user. For analytical purposes, for example, where economy is not an important factor, it may be desirable to employ a high proportion of hypophosphorous acid to assure the preservation of as much of the tryptophan as possible. On the other hand, where the protein hydrolysates are to be used commercially as a source of individual amino acids or in the preparation of nutritional mixtures, it is of course preferable with regard to both economy and speed of hydrolysis to employ as small a proportion of the more expensive hypophosphorous acid as is consistent with the realization of the advantages of our process.

The total concentration of acid in the hydrolyzing medium and the weight of acid per given weight of protein can be varied considerably according to the desired rate of hydrolysis, the choice of protein, temperature, etc. We ordinarily find it convenient to employ an aqueous solution containing 5–10% by weight of acids. The total weight of the acids employed can be about 30% to more than 400% of the weight of the protein to be hydrolyzed; we prefer to employ a range of about 50–200%.

In general, we have found that acid mixtures wherein, in terms of equivalents, about 10–20% of the total acid content is hypophosphorous acid and about 80–90% is hydrochloric, sulfuric or phosphoric acid will substantially completely hydrolyze the protein within six to forty-eight hours at 100–130° C.

The process of our invention can be employed to hydrolyze a wide variety of proteinaceous materials. Although it is also applicable to proteins which do not contain tryptophan, it will be readily appreciated that the present invention will offer its principal advantage in the hydrolysis of tryptophan-containing proteinaceous material, for example blood proteins, casein, lactalbumin, egg albumin, soy bean protein, beef, liver cake, etc. When the protein hydrolysate is to be employed to prepare dietary or nutritional agents, we prefer of course to use a protein which on hydrolysis yields all of the essential amino acids, including tryptophan.

Our invention is illustrated by the following examples without, however, being limited thereto.

Example 1

To a mixture of 12.4 pounds of 50% hypophosphorous acid and 155 pounds of de-ionized water, there was added with stirring 19.8 pounds of casein (14.05% nitrogen) and this mixture was heated and stirred in an autoclave at 125° C. for two hours. To the reaction mixture there was then added 32.6 pounds (12.45 liters) of concentrated hydrochloric acid (12 N) and 137.5 pounds of de-ionized water. The mixture was then further heated in an autoclave with stirring at 125° C. for sixteen hours. The protein hydrolysate thus obtained was free of insoluble humin and contained about 0.57 mg. of tryptophan per ml., this value representing the preservation of about 80% of the original tryptophan content of the casein.

The protein hydrolysate was used to prepare a nutritional product in the following manner. The reaction mixture was filtered by suction and the filtrate was concentrated under reduced pressure to near dryness at the lowest temperature consistent with an adequate rate of distillation. The distillation residue was dissolved in approximately 100 pounds of pyrogen-free water at about 60–90° C. This solution was stirred until the residue was completely dissolved, and then a further portion of about 230 pounds of cold water was added. The solution was chilled to less than 5° C. in a cooling tank and 100 pounds of moist anion-exchange resin (for example, the amine-type resin known as Ionac A–300) was added. The resulting mixture was stirred for thirty minutes and then filtered by suction. The resin was sucked as dry as possible while pressing the filter cake. The resin was transferred to a clean kettle which had been rinsed with pyrogen-free water.

The filtrate was stirred with another 50 pounds of moist anion-exchange resin for fifteen minutes. Additional resin was added to the filtrate in 5 to 10 pound batches until the filtrate attained a pH of 5.8–5.9, pH determination being made about five minutes after addition of each portion of resin. The mixture was stirred for a further period of fifteen minutes and then filtered by suction, the resin again being sucked as dry as possible. The filtrate, which had a pH 6.0, was sterilized by filtration through a suitable bacteriological filter and was stored aseptically at 0–4° C. for about forty-eight hours. The nitrogen content of this product was determined by the Kjeldahl method and sufficient pyrogen-free water was added to adjust the nitrogen content to a value of 7.4 mg. of nitrogen per ml.

The two resin residues obtained from the above procedure were combined and stirred with 75 liters of pyrogen-free water for about fifteen minutes and then filtered by suction, the resin being sucked as dry as possible. The filtrate was permitted to remain in the collection chamber while the resin residue was re-suspended in another 75 liters of pyrogen-free water, stirred for 5–10 minutes, and finally filtered by suction through the same unit used previously.

The combined resin wash filtrates were sterilized by filtration through the same bacteriological filter used to sterilize the protein hydrolysate and were stored separately at low temperature. The resin wash filtrates were used to dissolve the vacuum distillation residue obtained in the subsequent batch.

Example 2

780 g. of concentrated sulfuric acid (96%) and 312 ml. of 50% hypophosphorous acid were dissolved in 11.75 liters of distilled water. To this solution there was added 780 g. of casein (14.05% nitrogen) and the mixture was heated at about 125° C. in an autoclave for seventeen hours. The protein hydrolysate thus obtained contained practically no insoluble humin. The tryptophan content of this solution was about 0.53 mg. of tryptophan per ml., thus representing the preservation of about 75% of the original tryptophan content of the casein.

Removal of sulfate ion from the hydrolysate was carried out as follows. The reaction mixture obtained above was allowed to cool to about 70° C. and there was then added with stirring a hot solution of 2366 g. of barium hydroxide octahydrate in 1.0 liter of water. There was a small amount of foaming during the addition of the barium hydroxide solution. 120 g. activated charcoal was then added to the reaction mixture to promote filtration. The mixture was stirred for thirty minutes and was then filtered.

The filtrate was a pale yellow liquid having pH 2.7.

For removal of hypophosphorous acid, the ion-exchange technique described in Example 1 was employed.

Example 3

1895 g. of concentrated sulfuric acid (96%) and 750 ml. of 50% hypophosphorous acid were dissolved in 23.25 liters of distilled water, and to this solution there was added 1510 g. of lactalbumin (12.5% nitrogen). The mixture was placed in an autoclave, the air above this suspension thus obtained was replaced by an atmosphere of nitrogen and the mixture was heated in an autoclave at 125° C. for seventeen hours. There was thus obtained a protein hydrolysate which was practically free of insoluble humin and which contained 0.88 mg. of tryptophan per ml., this value representing the preservation of about 75% of the original tryptophan content of the lactalbumin.

The hydrolysate obtained as above described, which had a volume of about 24 liters, was divided into two 12-liter portions, each of which was treated in the following manner. 12 liters of the hydrolysis mixture was heated to 85–90° C. and to the warm solution there was added with stirring a solution of 2840 g. of barium hydroxide octahydrate in 1200 ml. of water at 95° C. After addition of the barium hydroxide was complete, 170 g. of activated charcoal was added to the mixture. The mixture was stirred for thirty minutes and was then filtered. The filtrate consisted of a yellow liquid having a pH=2.5.

For the removal of hypophosphorous acid, the ion-exchange technique described in Example 1 was employed.

We claim:

1. The process for obtaining a protein hydrolysate which comprises heating at 100–170° C. a proteinaceous material with an aqueous solution of a mixture of hypophosphorous acid and a strong mineral acid of the group consisting of hydrochloric acid, sulfuric acid, and phosphoric acid, the equivalent proportion of hypophosphorous acid in said mixture of acids being at least about 10%.

2. The process for obtaining a protein hydrolysate which comprises heating at 100–170° C. a proteinaceous material with an aqueous solution of a mixture of hypophosphorous acid and hydrochloric acid, the equivalent proportion of hypophosphorous acid in said mixture of acids being at least about 10%.

3. The process for obtaining a protein hydrolysate which comprises heating at 100–170° C. a proteinaceous material with an aqueous solution of a mixture of hypophosphorous acid and sulfuric acid, the equivalent proportion of hypophosphorous acid in said mixture of acids being at least about 10%.

4. The process for obtaining a protein hydrolysate which comprises heating at 100–170° C. a proteinaceous material with an aqueous solution of a mixture of hypophosphorous acid and phosphoric acid, the equivalent proportion of hypophosphorous acid in said mixture of acids being at least about 10%.

5. The process according to claim 1 wherein the proteinaceous material is subjected to a preliminary heating with the aqueous hypophosphorous acid alone before addition of the strong mineral acid.

6. The process of hydrolyzing a protein to obtain a mixture of amino acids which comprises heating the protein with a solution containing a mixture of hypophosphorous acid and a hydrolyzing mineral acid selected from the group consisting of sulfuric acid and hydrochloric acid.

References Cited in the file of this patent

Anson et al., "Advances in Protein Chemistry," vol. II (Academic Press; New York; 1945), page 122.

Spalton, Mfg. Chemist and Mfg. Perfumer, vol. 18, pages 59–65 (1947).